United States Patent
Locher et al.

(10) Patent No.: US 11,075,748 B2
(45) Date of Patent: Jul. 27, 2021

(54) ENCRYPTION FOR LOW-END DEVICES THROUGH COMPUTATION OFFLOADING

(71) Applicant: ABB Schweiz AG, Baden (CH)

(72) Inventors: Thomas Locher, Zürich (CH); Johannes Schneider, Fislisbach (CH); Matus Harvan, Zürich (CH); Sebastian Obermeier, Schinznach-Dorf (CH); Yvonne-Anne Pignolet, Zürich (CH)

(73) Assignee: ABB SCHWEIZ AG, Baden (CH)

( * ) Notice: Subject to any disclaimer, the term of this patent is extended or adjusted under 35 U.S.C. 154(b) by 290 days.

(21) Appl. No.: 16/189,108

(22) Filed: Nov. 13, 2018

(65) Prior Publication Data
US 2019/0089526 A1   Mar. 21, 2019

Related U.S. Application Data

(63) Continuation of application No. PCT/EP2017/060937, filed on May 8, 2017.

(30) Foreign Application Priority Data

May 13, 2016 (EP) .................................. 16169599

(51) Int. Cl.
*H04L 9/06* (2006.01)
*H04L 9/30* (2006.01)
*H04L 9/00* (2006.01)

(52) U.S. Cl.
CPC ............ *H04L 9/0656* (2013.01); *H04L 9/008* (2013.01); *H04L 9/30* (2013.01); *H04L 2209/08* (2013.01); *H04L 2209/76* (2013.01)

(58) Field of Classification Search
USPC .......... 380/28, 255, 264, 276; 713/150, 163, 713/181; 726/2, 21, 36
See application file for complete search history.

(56) References Cited

U.S. PATENT DOCUMENTS

| | | | |
|---|---|---|---|
| 2009/0182667 A1* | 7/2009 | Parkes | H04L 9/3033 705/50 |
| 2012/0159180 A1* | 6/2012 | Chase | G06F 21/6227 713/183 |
| 2019/0034646 A1* | 1/2019 | Fujiwara | G06F 16/24 |

OTHER PUBLICATIONS

European Patent Office, International Search Report & Written Opinion issued in corresponding Application No. PCT/EP2017/060937, dated Jul. 21, 2017, 9 pp.

(Continued)

*Primary Examiner* — Sharif E Ullah
(74) *Attorney, Agent, or Firm* — Taft Stettinius & Hollister LLP

(57) ABSTRACT

The application relates to a method for computing a probabilistic encryption scheme for encrypting a data item in an electronic device including: computing a plurality of random bit strings in a computation cluster; sending the computed plurality of random strings to the electronic device; generating a random string ($r_E$) for using in the encryption scheme in the electronic device using a subset of the plurality of the random strings computed in the computation cluster and encrypting the data item using the random string computed in the electronic device. The present application also relates to a corresponding system and corresponding computer program product including one or more computer readable media having computer executable instructions for performing the steps of the method.

15 Claims, 1 Drawing Sheet

(56) References Cited

OTHER PUBLICATIONS

European Patent Office, Extended Search Report issued in corresponding Application No. 16169599.4, dated Nov. 21, 2016, 6 pp.
Abb Schweiz AG, PCT Direct Letter submitted to European Patent Office dated May 5, 2017, in corresponding Application No. PCT/EP2017/060937, 21 pp.
Hohenberger et al., "How to Securely Outsource Cryptographic Computations," Theory of Cryptography: Second Theory of Cryptography Conference, TCC 2005, Cambridge, Massechussetts, Feb. 10-12, 2005, pp. 264-282.
Nguyen et al., "Distribution of Modular Sums and the Security of the Server Aided Exponentiation," in "Cryptography and Computational Number Theory," Jan. 2001, Birkhauser, Basel, 12 pp.
Van Dijk et al., "Speeding up Exponentiation using an Untrusted Computational Resource," Designs, Codes and Cryptography, vol. 39, 2006, pp. 253-273.

\* cited by examiner

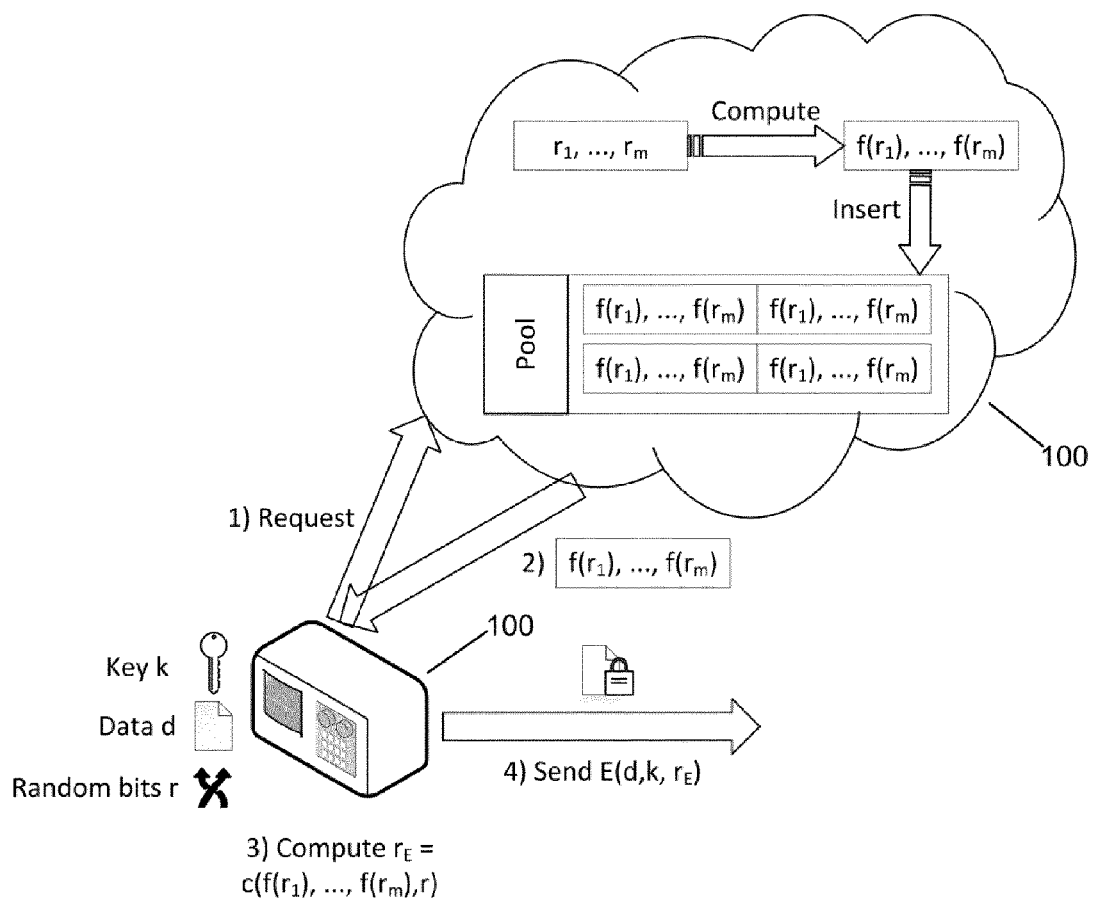

ENCRYPTION FOR LOW-END DEVICES THROUGH COMPUTATION OFFLOADING

FIELD OF THE INVENTION

The invention relates to a method and a system for computing a probabilistic encryption scheme for encrypting a data item in an electronic device.

BACKGROUND OF THE INVENTION

Cloud computing, e.g. in the computation cluster, provides access to a shared pool of configurable and inexpensive computing and storage resources. Cloud computing providers offer various capabilities to store and process data. In an industrial context, cloud computing can provide the monitoring and measurement of data produced by low-end devices available for later retrieval and for resource-intensive processing.

However, cloud computing requires trust both in the cloud provider and in the confidentiality of the connection transmitting the data into the cloud. As a consequence, many users are reluctant to entrust the cloud with their data, despite the potential benefits.

In order to solve the trust issue, customers can encrypt their data before sending it to the cloud. If the data should also be processed in the cloud, then commonly used encryptions schemes, e.g. AES, DES, or blowfish, require the data to be decrypted before it can be processed.

Thus, generally, either the user stores the encryption keys in the cloud where the cloud provider could illicitly use the keys to decrypt the data. Alternatively, the user downloads the encrypted data from the cloud, decrypts it and processes it locally. However, in this case the computational resources of the cloud are not utilized. If homomorphic encryption schemes are used, then the data can be processed in the cloud without providing decryption keys to the cloud provider. In other words, it is possible to compute key performance indices and carry out computations for trend analysis and fleet management efficiently even if the cloud provider stores data in encrypted form.

However, low-end devices producing valuable data to be sent to cloud providers are equipped with limited computing resources. In particular, they may not have the computational power for the encryption. Apart from the encryption process itself, the creation of randomness for the encryption is also computationally expensive. It is thus an objective to use encryption to protect data coming from many low-end devices.

The journal contribution of Hohenberger et al. "How to Securely Outsource Cryptographic Computations", in Kilian J. (eds) Theory of Cryptography. TCC 2005, Lecture Notes in Computer Science, vol 3378, Springer, Berlin, Heidelberg relates to the problem of using untrusted and potentially malicious cryptographic helpers and aims at providing a formal security definition for securely outsourcing computations from a computationally limited device to an untrusted helper.

The journal contribution of van Dijk et al. "Speeding up Exponentiation using an Untrusted Computational Resource", Des Codes Crypt (2006) 39: 253, relates to protocols aimed at speeding up fixed-base variable-exponent exponentiation and variable-base fixed-exponent exponentiation using an untrusted computational resource.

The journal contribution of Nguyen et al. "Distribution of Modular Sums and the Security of the Server Aided Exponentiation" in: Lam K Y., Shparlinski I., Wang H., Xing C. (eds) Cryptography and Computational Number Theory. Progress in Computer Science and Applied Logic, vol 20. Birkhäuser, Basel aims at establishing the security of some discrete logarithm based signature schemes making use of a certain generator.

DESCRIPTION OF THE INVENTION

These and other objectives are achieved by a method, a system and a computer program product according to the independent claims. Preferred embodiments are evident from the dependent patent claims.

The present invention refers to a mechanism that allows resource-constrained computational devices to outsource cryptographic operations to a cloud.

The present invention targets probabilistic encryption schemes, which use random bits in the encryption process.

The invention enables strong protection of data that is produced and sent out by low-end devices. Examples for such low-end devices are protection devices, flow meters, merging units, e.g. merging sensor, or the like. To this end, the device according to the present invention offloads the task of computing randomness and computationally intensive parts of the encryption process to more powerful machines running in a computation cluster.

Normally, the computational cost of using encryption at the device level is often prohibitively high. However, the present invention allows a cost effective encryption at the device level, which is an enabler for remote data storage and processing of confidential customer data.

The first key property of the invention is that the computational overhead due to encryption is reduced significantly, potentially reducing it by 90-99%, and the amount of randomness that must be generated by the devices reduces substantially as well, by 90% or more.

The second key property of the invention is that the computation cluster only must be trusted to carry out the computation correctly and to generate randomness of high quality. The computation cluster cannot decrypt the data that is subsequently encrypted by the devices. Therefore, there is no need to trust the computation cluster to keep any data confidential, including the encryption material for the devices.

The present invention refers to a method that leverages the large computational power of a computation cluster to lower the burden on low-end devices. To this end, it basically uses a combination of two steps: the pre-computation of encryption parts in the cloud, i.e. a computation cluster, and re-combination of these parts in the electric device which is not capable or barely capable of computing the encryption parts.

Generally, in probabilistic encryption schemes, some randomness is used to encrypt data, i.e., encryption is a function E: (D×K×R)→C that takes the data to be encrypted D, the key K, and random bits R as input and produces the cipher text C.

For some functions, another function f: R→R' is applied to the pure random bits before mixing them with the key and the data to produce the cipher text. In the present invention, the generation of the random bits and the computation of the function f are offloaded to the computation cluster. In particular, these operations are not just offloaded but pre-computed before they are needed for encryption: Preferably, the computation cluster computes and stores many strings of pre-computed bits in a pool/storage.

In theory, if a device requests such a random bit string, the computation cluster could retrieve one single string and send it to the device. The string would then be deleted at the computation cluster, i.e., the same bits would never reused. This procedure would ensure that random bits can be retrieved from the computation cluster without introducing a large delay.

However, the problem with sending only one single string is that the computation cluster knows all random bits, which can be used to try to break the encryption and to jeopardize the encryption scheme. The re-combination according to the present invention of the present invention solves this problem as follows.

Instead of computing a single string of random bits, preferably processed by f, the computation cluster computes many such strings, applies the function f to each string, and returns them to the device.

The electronic device uses another function c to combine a subset of the received bit strings into the bit string that it actually uses for encryption. Therefore, unless the computation cluster guesses the random bits that the device has used as input for the function c, which is almost impossible, it is computationally infeasible for the computation cluster to deduce the random bit string that is used in the encryption.

The advantage of this scheme is that the corresponding combination function c, carried out in the electric device, is computationally much cheaper than function f, carried out in the computational cluster, both in terms of the computational complexity as well as the number of random bits that are used.

The invention relates to a method for computing a probabilistic encryption scheme for encrypting a data item in an electronic device. The invention comprises the steps of:
(a) computing a plurality of random bit strings in a computation cluster;
(b) sending the computed plurality of random strings to the electronic device;
(c) generating a random string $r_E$ for using in the encryption scheme in the electronic device using a subset of the plurality of the random strings computed in the computation cluster; and
(d) encrypting the data item using the random string computed in the electronic device.

In other words, encrypting the data item is performed by using the random string computed in the electronic device and an encryption key k.

Preferably, the electric device has limited computational resources and/or is preferably not capable of computing the plurality of random bit strings.

Preferably, generating the random string $r_E$ comprises recombining of the subset of the plurality of the random strings computed in the computation cluster, preferably using a recombination function c.

Preferably, the plurality of random bit strings is processed with a randomness preparation function f in the computation cluster before sending to the electronic device.

Preferably, the generation of the random string for using in the encryption scheme in the electronic device is performed using the following function:

$$r_E = c(f(r_1), \ldots, f(r_m), r),$$

with $r_E$ being the random string for using in the encryption scheme, c being the recombination function, $r_1 \ldots r_m$ being the plurality of random strings computed in the computation cluster and r being a random bit string generated in the electronic device, preferably a random bit string of length $q \cdot \log_2(m)$ with m being the number of random strings sent from the computation cluster and q being a predefined parameter. In other words, the function f is based on modular exponentiation and is preferably applicable to encryption schemes according to [1], [2], [3], [4], [5] and/or [6] and is preferably defined as follows:
$f(R) \to R$ (where R is a random bit string) is $f(r) = r^n \pmod{n^2}$ for some parameter n.
$c(f(r_1), \ldots, f(r_m), r)$ is defined as follows: The bit string r is split into q pieces of length $\log_2(m)$, which corresponds to q indices into a/the list of m random number strings $f(r_1), \ldots, f(r_m)$. The corresponding q bit strings are multiplied, i.e., $f(r_{i_1}) \bullet \ldots \bullet f(r_{i_q}) = (r_{i1} \bullet \ldots \bullet r_{iq})^n = r'^n$ for some r'. The exponentiation in the encryption process is therefore transformed into q multiplications leading to a reduced expense of computation.

Preferably, the recombination function c is based on multiplication.

Preferably, the function f is based on matrix-vector multiplication and is preferably applicable to encryption schemes based on "general learning with error", GLWE, preferably according to [7] and/or [8] and is preferably defined as follows:
$f(R) \to R$ (where R is a random bit string) is $f(r) = A^T r$ for a matrix A.
The cluster splits A into q matrices ($A_1$ contains the first q columns etc.). It computes $A_i^T r$ (for smaller r) multiple times for each index i.
$c(f(r_1), \ldots, f(r_m), r)$ is defined as follows: m is a multiple of q, i.e., there are m/q random components for each sub-matrix A. A random component is selected randomly for each $A_i$ and the results are concatenated, resulting in a component of the desired form $A^T r$.

Preferably, the recombination function c is based on vector concatenation.

Preferably, the function f is based on polynomial multiplication and is preferably applicable to encryption schemes based on an NTRU encryption scheme [9], preferably according to [10] and is preferably defined as follows:
$f(R) \to R$ (where R is a random bit string) is $f(r) = rs$ where both r and s are interpreted as polynomials of a certain degree (s is given).
$c(f(r_1), \ldots, f(r_m), r)$ is preferably based on polynomial addition.

Preferably, the method further comprises the step of storing the plurality of random strings in a storage of the computation cluster.

Preferably, the electronic device requests the plurality of random bit strings from the computation cluster.

Preferably, the encryption scheme is a homomorphic encryption scheme, preferably an additively homomorphic encryption scheme.

Preferably, the encryption scheme is an encryption scheme defined as follows:

$$E(d,(g,n),R) = g^d \bullet R^n \pmod{n^2},$$

with d being the data item, the pair (g,n) being the key, R being the random string for using in the encryption scheme, g is a generator and n is the size of the plain text space.

The invention also relates to a computer program product comprising one or more computer readable media having computer executable instructions for performing the steps of any of the aforementioned methods.

The invention also relates to a system for computing a probabilistic encryption scheme for encrypting a data item in an electronic device comprising:
a computation cluster configured to compute a plurality of random bit strings and comprising a sending unit configured to send the computed plurality of random strings to the electronic device; and the electronic device being configured to generate a random string for using in the encryption scheme using a subset of the plurality of the random strings computed in the computation cluster and the electronic device of the system being further configured to encrypt the data item using the random string that it has computed.

Preferably, the computation cluster of the system is further configured to process the plurality of random bit strings with a function f before sending the plurality of random bit strings to the electronic device.

Preferably, the computation cluster of the system is further configured to generate the random strings for using in the encryption scheme using one of the above-mentioned functions f.

Preferably, the computation cluster further comprises a storage configured to store the plurality of random strings.

The invention also relates to a computer program product comprising one or more computer readable media having computer executable instructions for performing the steps of any of the aforementioned methods.

BRIEF DESCRIPTION OF THE DRAWINGS

The subject matter of the invention will be explained in more detail in the following text with reference to preferred exemplary embodiments which are illustrated in the attached drawings, in which:

FIG. 1 schematically shows a system for computing an encryption scheme for encrypting a data item.

The reference symbols used in the drawings, and their primary meanings, are listed in summary form in the list of designations. In principle, identical parts are provided with the same reference symbols in the figures.

DETAILED DESCRIPTION OF PREFERRED EMBODIMENTS

FIG. 1 schematically shows a system for computing an encryption scheme for encrypting a data item.

The system comprises an electronic device 100 and a computation cluster 200, hereinafter referred to as the cloud 200.

The cloud 200 generates a plurality of random bit strings using a randomness preparation function f and stores them in a pool of the cloud 200. In this preferred embodiment, the plurality of random bit strings is generated by generating a plurality of random bits and applying the randomness preparation function f to the before generated random bits. However, it is understood by the skilled person that an appropriate randomness preparation function f can also generate a plurality of random bit strings ab initio, i.e. without generating a plurality of random bit strings before in a preceding step.

As soon as an electronic device 100 requests a plurality of random bit strings, the cloud 200 sends the requested plurality of random bit strings to the electronic device 100. The electronic device 100 holds a data item d that it wants to encrypt.

The device 100 receives a set of random bit strings $f(r_1), \ldots f(r_m)$. The device 100 then computes a random bit string $r_E$ that is used for encryption. According to this embodiment, the random bit string $r_E$ can be defined as follows:

$r_E = c(f(r_1), \ldots, f(r_m), r)$, where r is a random bit string of length $q \cdot \log_2(m)$, for some parameter q, that the device 100 generated itself.

Next, the device 100 encrypts the data item d, using the random bit string $r_E$, using the encryption key k and sends out and/or or stores the encrypted result $E(d,k,r_E)$.

Thus, the device 100 still needs to produce some but significantly fewer random bits itself. More importantly, the device 100 still must perform some computations but the computations are not as expensive as encrypting the data item d on its own.

In an exemplary embodiment, a homomorphic encryption scheme is used, i.e., an encryption scheme that offers some computational capabilities in the cipher text space without access to decryption keys.

As an example, the Paillier encryption scheme [1] is considered, which encrypts a data item d as follows:

$$E(d,k,r) = g^d \cdot r^n (\mod n^2),$$

where g is a so-called generator and n is the size of the plain text space.

If $g := 1+n$, it can be shown that the encryption function becomes $E(d,k,r) = (1+d \cdot n) \cdot r^n \pmod{n^2}$.

The function f is therefore $f(r) = r^n \pmod{n^2}$, i.e., an expensive exponentiation because both r and n are large numbers, and a reduction modulo $n^2$.

In fact, this exponentiation is the dominant factor in the encryption time. The function $c(f(r_1), \ldots, f(r_m), r) = c(r_1^n \pmod{n^2}, \ldots, r_m^n \pmod{n^2}, r)$ is defined as follows: The bit string r is split into q pieces of length $\log_2(m)$, which corresponds to q indices into the list of m random number strings $f(r_1), \ldots, f(r_m)$. The corresponding q bit strings are multiplied, i.e., $f(r_{i_1}) \cdot \ldots \cdot f(r_{i_1}) \cdot \ldots \cdot r_{i_q})^n$. According to this exemplary embodiment of the present invention, the exponentiation in the encryption process ($r^n$) is therefore transformed into q multiplications, which is less time-consuming and requires less computational power.

There are $m^q$ ways to select q indices out of m, in particular with potential repetitions. For reasonable parameters, which reduce the computational effort at the device considerably, it is infeasible for the compute cluster to determine the random component that is actually used in the encryption.

For the Paillier encryption scheme [1], a reasonable security can be achieved when choosing n, i.e. the product of two random prime numbers as a 1024-bit number.

If q is set to 16 and m is set to 32, $q \cdot \log_2(m) = 80$ random bits are needed at the electronic device 100.

This is roughly 8% of the 1024 random bits that would typically be used for r. Moreover, there are $m^q = 2^{80}$ ways to choose q indices, which corresponds to 80-bit security. Thus, it is not feasible for the computation cluster 200 to determine the used random component.

As far as the computation time is concerned, the exponentiation $r^n$ of 1024-bit numbers is replaced with the multiplication of $q=16$ 1024-bit numbers.

Experiments show that all multiplications together cost roughly 3% of the cost of the exponentiation. Thus, as the remaining steps in the encryption are not costly, the time to encrypt is reduced roughly by a factor of 30.

The numbers even improve when increasing the security level: When n is a 2048-bit number, and q is set to 16 and m is set to 32, $q \cdot \log_2(m) = 80$ random bits are needed at the electronic device, which is roughly 4% of the number of random bits. The exponentiation $r^n$ of 2048-bit numbers even takes more than 100 times longer compared to the 8 multiplication of 2048-bit numbers.

In addition, the device 100 must solely receive $32 \cdot 1024$ bit=4 KB to encrypt a single message, which takes 0.3125 ms to send over a 100 Mbit/s link. Therefore, up to 3200 data items can be encrypted per second.

If 2048-bit numbers are used, 1600 encryptions are possible per second. Moreover, the present invention using this back-of-the-envelope calculation according to this embodiment ignores overhead due to the communication protocols, which reduces the feasible number of encryptions per second slightly.

These numbers are summarized in the following table. The compute time and number of random bits are relative to the compute time and the number of random bits that would be necessary without our mechanism. Encryptions per second refer to communication over a 100 Mbit/s link between the device(s) and the compute cluster.

| Number size: | q: | m: | Compute time: | Random bits: | Encryptions per second: |
|---|---|---|---|---|---|
| 1024 (good security) | 16 | 32 | ≈3% | ≈8% | ≈3200 |
| 2048 (strong security) | 16 | 32 | ≈1% | ≈4% | ≈1600 |

Thus, the present invention significantly reduces the computational overhead for encryption on the electronic device, making the encryption on the device 100 for many applications feasible, without sacrificing security to achieve this goal.

While the invention has been described in detail in the drawings and foregoing description, such description is to be considered illustrative or exemplary and not restrictive. Variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

LIST OF DESIGNATIONS

100—Electronic device
200—Computation Cluster

REFERENCES

[1]—Pascal Paillier, Public-Key Cryptosystems Based on Composite Degree Residuosity Classes, J. Stern (Ed.): EUROCRYPT'99, LNCS 1592, pp. 223-238, 1999.
[2]—ElGamal, Taher. "A public key cryptosystem and a signature scheme based on discrete logarithms." Advances in cryptology. Springer Berlin Heidelberg, 1984.
[3]—Benaloh, Josh. "Dense probabilistic encryption." Proceedings of the workshop on selected areas of cryptography, 1994.
[4]—Damgard, Ivan and Jurik Mads. "A generalisation, a simplification and some applications of Paillier's probabilistic public-key system." In Proc. 4th International Workshop on Practice and Theory in Public Key Cryptosystems, 2001.
[5]—Okamoto, Tatsuaki; Uchiyama, Shigenori. "A new public-key cryptosystem as secure as factoring". Advances in Cryptology—EUROCRYPT'98, 1998.
[6]—Naccache, David and Stern, Jacques. "A new public key cryptosystem based on higher residues". In Proc. 5th ACM Conference on Computer and Communications Security (CCS), pp. 59-66, 1998.
[7]—Brakerski, Zvika, Craig Gentry, and Vinod Vaikuntanathan. "(Leveled) fully homomorphic encryption without bootstrapping." In Proc. 3rd ACM Innovations in Theoretical Computer Science Conference, 2012.
[8]—Gentry, Craig, Amit Sahai, and Brent Waters. "Homomorphic encryption from learning with errors: Conceptually-simpler, asymptotically-faster, attribute-based." Advances in Cryptology—CRYPTO 2013, 75-92, 2013.
[9]—U.S. Pat. No. 6,081,597 A
[10]—López-Alt, Adriana, Eran Tromer, and Vinod Vaikuntanathan. "On-the-fly multiparty computation on the cloud via multikey fully homomorphic encryption." In Proc. 44th Annual ACM Symposium on Theory of Computing (STOC), 2012.

The invention claimed is:

1. A method for computing a probabilistic encryption scheme for encrypting a data item in an electronic device comprising the steps of: a) computing a plurality of random bit strings in a computation cluster; b) sending the computed plurality of random strings to the electronic device; c) generating a random string rE for using in the encryption scheme in the electronic device using a subset of the plurality of the random strings computed in the computation cluster; and d) encrypting the data item using the random string computed in the electronic device, wherein generating the random string rE comprises recombining of the subset of the plurality of the random strings computed in the computation cluster, preferably using a recombination function c, wherein the plurality of random bit strings is processed with a randomness preparation function f in the computation cluster before sending to the electronic device, and wherein the generation of the random string for using in the encryption scheme in the electronic device is performed using the following function: $rE=c(f(r1),.f.rm),r)$, with rE being the random string for using in the encryption scheme, c being the recombination function, ri . . . rm being the plurality of random strings computed in the computation cluster and r being a random bit string generated in the electronic device, preferably a random bit string of length q·log 2(m) with m being the number of random strings sent from the computation cluster and q being a predefined parameter.

2. The method according to claim 1, further comprising the step of storing the plurality of random strings in a storage of the computation cluster.

3. The method according to claim 1, wherein the electronic device requests the plurality of random bit strings from the computation cluster.

4. The method according to claim 1, wherein the encryption scheme is a homomorphic encryption scheme, preferably an additively homomorphic encryption scheme, preferably an additively homomorphic encryption scheme.

5. The method according to claim 1, wherein the encryption scheme is an encryption scheme defined as follows: with d being the data item, the pair (g,n) being the key, R being the random string for using in the encryption scheme, g is a generator and n is the size of the plain text space.

6. A system for computing a probabilistic encryption scheme for encrypting a data item in an electronic device comprising: a computation cluster configured to compute a plurality of random bit strings and comprising a sending unit configured to send the computed plurality of random strings to the electronic device; the electronic device being configured to generate a random string for using in the encryption scheme using a subset of the plurality of the random strings computed in the computation cluster and the electronic device being further configured to encrypt the data item using the random string that it has computed, wherein the computation cluster is further configured to process the plurality of random bit strings with a function f before sending the plurality of random bit strings to the electronic device, and wherein the electronic device is further configured to generate the random string for using in the encryption scheme using the following function: with rE being the random string for using in the encryption scheme, ri . . . rm being the plurality of random strings computed in the computation cluster and r being a random bit string generated in the electronic device, preferably a random bit string of length q-log 2(m) with m being the number of random strings sent from the computation cluster and q being a predefined parameter.

7. The system according to claim 6, wherein the computation cluster further comprises a storage configured to store the plurality of random strings.

8. A computer readable media for computing a probabilistic encryption scheme for encrypting a data item in an electronic device comprising: computer executable instructions effective to: compute a plurality of random bit strings in a computation cluster; send the computed plurality of random strings to the electronic device; generate a random string for using in the encryption scheme in the electronic device using a subset of the plurality of the random strings computed in the computation cluster; and encrypt the data item using the random string computed in the electronic device; wherein the computer executable instructions are effective to: process the plurality of random bit strings with a function f before sending the plurality of random bit strings to the electronic device, and generate the random string for using in the encryption scheme using the following function: rE=c(f(r1), . . . , f(rmr), with rE being the random string for using in the encryption scheme, ri . . . rm being the plurality of random strings computed in the computation cluster and r being a random bit string generated in the electronic device, preferably a random bit string of length q-log 2(m) with m being the number of random strings sent from the computation cluster and q being a predefined parameter.

9. The method according to claim 1, wherein the plurality of random bit strings is processed with a randomness preparation function fin the computation cluster before sending to the electronic device.

10. The method according to claim 1, further comprising the step of storing the plurality of random strings in a storage of the computation cluster.

11. The method according to claim 1, further comprising the step of storing the plurality of random strings in a storage of the computation cluster.

12. The method according to claim 2, wherein the electronic device requests the plurality of random bit strings from the computation cluster.

13. The method according to claim 1, wherein the electronic device requests the plurality of random bit strings from the computation cluster.

14. The system according to claim 6, wherein the computation cluster further comprises a storage configured to store the plurality of random strings.

15. The system according to claim 6, wherein the computation cluster further comprises a storage configured to store the plurality of random strings.

* * * * *